Feb. 8, 1938.  G. SPERTI  2,107,718

DEVICE FOR PROMOTING UNIFORM AND HOMOGENEOUS FREEZING

Original Filed April 5, 1934

INVENTOR.
George Sperti
BY Allen + Allen
ATTORNEYS.

Patented Feb. 8, 1938

2,107,718

UNITED STATES PATENT OFFICE 2,107,718

DEVICE FOR PROMOTING UNIFORM AND HOMOGENEOUS FREEZING

George Sperti, Covington, Ky.

Application April 5, 1934, Serial No. 719,170
Renewed July 7, 1937

4 Claims. (Cl. 259—72)

My invention relates primarily to the problem of freezing mixtures in the trays of modern electrical refrigerators or the like. While it is not restricted thereto, it is of especial utility in the making of frozen desserts. In general, the difficulty had with frozen desserts under the circumstances referred to, is threefold: First, the mixtures tend to freeze with large grained crystals, which are unsatisfactory, and give a product must less pleasant and palatable than the fine grained frozen mixtures which are produced where the mixtures are agitated and worked during the freezing operation. Second, the freezing of said mixtures in trays in the refrigerator is relatively a slow process, due primarily to the fact that a rim of ice forms about the exposed edges of the tray, which ice then acts as an insulator and retards the abstraction of heat from central portions of the mixture. As a consequence, plenty of time is allowed for segregation of ingredients, so that prior to the freezing of the mixture, it happens in many instances that the mixture separates into two or more layers of different composition. In the third place, where freezing is conducted in the absence of agitation, there tends to be a selective freezing of certain ingredients, so that the mixture for this reason also tends to become non-homogeneous. It is difficult to apply agitation or stirring to a mixture in a refrigerator tray because it is essential that the mixture be not spattered or thrown about by the agitating means, so that it does not get outside the tray and collect in other trays, or upon the walls of the refrigerator evaporator.

In the light of these problems, it is a fundamental purpose of my invention to provide means and a method for promoting the homogeneous and fine grained freezing of mixtures in the trays of a refrigerator or the like. I have discovered in practical operation that the procedure and devices hereinafter set forth result in a marked shortening of the freezing time, and I may note this as another object of my invention, it being understood that my invention is neither restricted to the freezing of mixtures as such, nor is it restricted to use in the particular circumstances in which I shall hereinafter describe it, for the purpose of making an exemplary showing.

These and other objects of my invention which will be set forth hereinafter, or will be apparent to one skilled in the art upon reading these specifications, I accomplish by that certain method and by that construction and arrangement of parts, of which I shall hereinafter describe certain preferred embodiments.

Reference may be made to the drawing, wherein.

Briefly in the practice of my invention I have found that I can attain the objects aforesaid by subjecting the liquid or mixture in the tray or other container, to vibrations of a relatively high frequency, say, within the audible range. Devices which produce a stirring or bodily linear movement of considerable magnitude in the liquid are undesirable, for the reason that they produce a spattering of the liquid, and also for the reason that they require a good deal more power. I have found however, that by subjecting the liquid in a container to vibrational forces of relatively high frequency, I can, up until the actual congealing of the liquid or mixtures, maintain the molecules thereof in a condition of motion which is conducive to freezing in a fine grained and homogeneous manner, and which prevents segregation of the ingredients. It is my practice to keep the liquid under the influence of these vibrational forces during the freezing cycle. The liquid appears to hum, as it were, and if the vibrations are of a suitable frequency in connection with the size of the container, nodal points may be set up in the liquid. In spite of this molecular agitation however, the liquid has no tendency to spatter or be thrown about. I prefer, for convenience, to energize my vibrating means by an electromagnet fed with alternating current. It will be clear that if an electro-magnet is energized by the ordinary alternating current of 60 cycles, an armature arranged to be driven thereby, will be vibrated at a frequency of 120 cycles per second, since the magnet will pull upon and release the armature twice for each cycle of the alternating current. I shall hereinafter describe two ways of accomplishing my purpose with such an electro-magnet. One of these ways involves the provision of an armature, a member driven by the armature and a series of members attached to the driven member and arranged to contact the liquid. Another of these ways involves the use of a portion of the tray or container itself as a vibrating means arranged to be driven directly or indirectly by the magnet. My invention also contemplates means in general for turning off the current and de-energizing the magnet at the end of the freezing cycle, where such means are desired.

Figure 1:
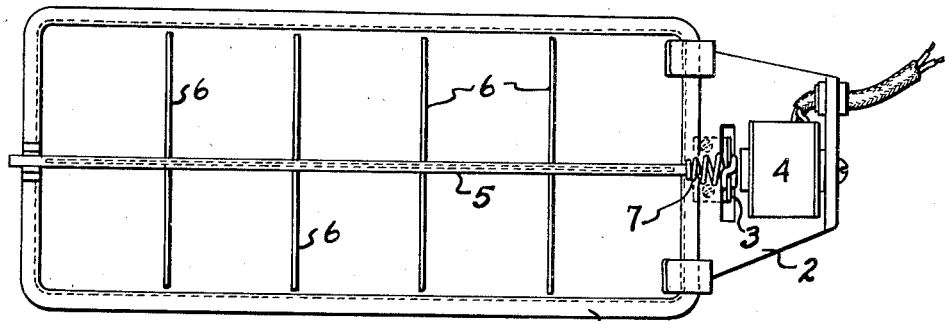
Figure 1 is a plan view of one form of my apparatus applied to an ordinary ice cube tray.
Figure 2:
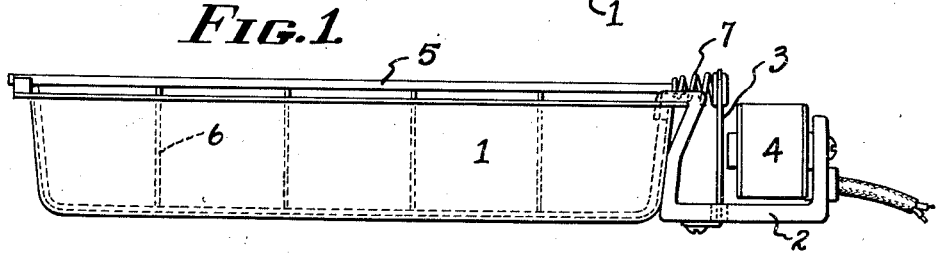
Figure 2 is an elevational view thereof.

Reference to Figures 1 and 2 will show a tray 1, which may be the ordinary ice cube freezing tray, in an electric refrigerator. To the end of this tray I have shown a bracket 2 which may be either permanently or detachably affixed. This bracket supports an armature 3 and an electro-magnet 4 arranged to be actuated by alternating current. To this end the core of the electro-magnet will preferably be laminated, and either of soft iron or of any of the high permeable magnetic alloys which are in current use. The winding will be proportioned in well known ways to the voltage of the current being employed. I have shown a driven member 5 in the form of a rod supported above the tray. This rod bears vanes 6 rigidly attached thereto, and extending down into the liquid in the tray. Preferably, although not necessarily, the rod 5 may be attached to the armature 3 by a stiff spring 7. The purpose of this spring is to permit the transmission of motion from the armature to the driven member while providing a resilient connection which will take up the motion of the armature, if the driven member becomes stalled by reason of the freezing of the mixture in the tray. In operation the magnet 4 will be connected by appropriate leads to a source of power, for which purpose it will usually be the practice to provide a suitable power outlet in the refrigerator, and to provide the leads from the magnet 4 with a suitable interfitting connection.

Various modifications may be made in this form of structure as will be apparent to one skilled in the art. For example, where space permits, the magnet and its associated armature may be located above the tray or container, and there may be fastened to the armature a member which enters the liquid to impart the vibrations of the armature thereto.

Figures 3, 4:
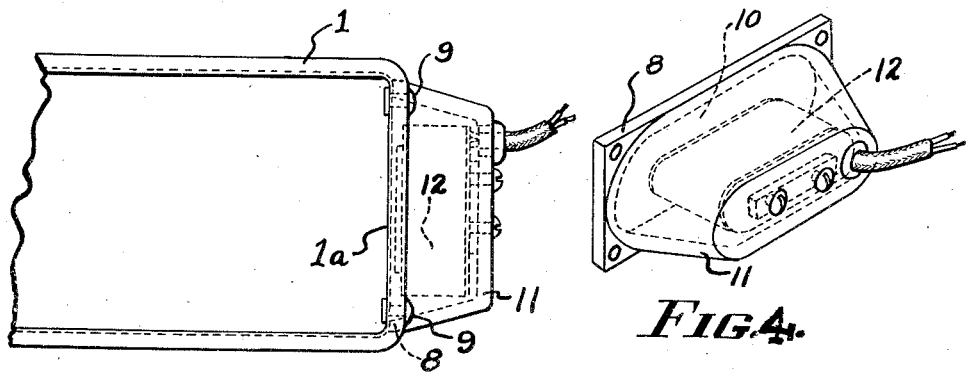
Figure 3 is a plan view of another form of apparatus.
Figure 4 is a perspective view of the apparatus of Figure 3.

I have shown a slightly different form of apparatus in Figures 3 and 4, wherein I again indicates the tray. I have shown a bracket 8 attached to the end of this tray as by rivets 9. The bracket may be a relatively heavy casting, preferably of non-magnetic material, although not necessarily so. The bracket may have a central perforation 10, so as to segregate a portion of the end of the tray indicated at 1a, in order to make a sort of diaphragm thereof. An extension 11 on the bracket serves to support an alternating current electro-magnet 12. In this instance the tray may be made of relatively thin magnetic material, such as sheet iron covered with a protective substance such as tin, on its interior portions at least, if desired. If it is preferred to make the tray of non-magnetic material, an armature member of magnetic material may be attached to the portion 1a thereof, as by a central rivet, or other fastening means, in a way which will be readily understood. In the operation of this device, the action of the electro-magnet will be to vibrate the end of the tray, at high frequency thereby directly imparting these vibrations to the liquid contained in the tray. This is in effect, a simpler form of device than the device of Figures 1 and 2. The bracket and associated apparatus may, of course, be made detachable from the tray.

Figure 5:
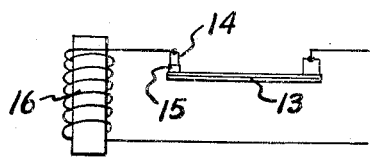
Figure 5 is a circuit diagram showing means whereby the action of my device may be inhibited at the end of the freezing cycle.

When the mixture in the trays of these several figures has frozen, the apparatus may, of course, be stalled; but this is not of particular consequence. In many applications it will not be necessary to provide any automatic means for turning off the current, since the operator may simply manually do this after the expiration of a given period of time, or after inspection has shown that the freezing process is complete. Where, however, a turn-off device is desired, I may employ either a time control device which may be set for a definite period by the operator, or I may employ some type of over-load switch, which, when the current consumption increases due to the stalling of the apparatus, will operate to break the circuit. I have also illustrated in Figure 5, a simple type of apparatus comprising a thermostatic element 13, arranged to operate contacts 14 and 15 in the circuit of the electro-magnet 16. The thermostatic element 13 will be a bimetallic arm arranged to open the contacts 15 when its temperature has been lowered beyond a definite minimum. The thermostatic element may then be located on or in connection with the bracket so as to be affected by the temperature of the material in the tray.

I have discovered that the operation of my device, as herein described, on the basis of comparative tests, results in the cutting of the time of the freezing cycle to about one-third. While I do not wish to be bound by theory, I explain this as being due to the molecular agitation heretofore described. This agitation results, among other things, in a uniform lowering of the temperature of the mixture rather than a freezing thereof merely about the edges of the container. Consequently heat exchange proceeds at a uniform rate from all parts of the liquid in the container, and as a result the freezing is much more efficient.

Modifications may be made in my invention without departing from the spirit thereof.

Having thus described my invention, what I claim as new and desire to secure by Letters Patent is:—

1. In combination with an ice tray, a bracket mounted upon said tray and an alternating current electro-magnet mounted upon said bracket, said tray being of magnetic material and said magnet being positioned to impart vibrations to a wall of said tray.

2. In combination with an ice tray, a bracket and an alternating current electro-magnet, said tray being of magnetic material and said magnet being positioned upon said bracket to impart vibrations to a wall of said tray, said bracket being attached to a wall of said tray and having a central perforation therein to segregate a portion of said wall to act as a diaphragm.

3. In combination an ice tray and an alternating current electro-magnet, means on the wall of said tray to be energized by said magnet and said magnet being so positioned as to energize said last mentioned means and thereby impart to a wall of said tray vibrational stresses.

4. Apparatus for freezing liquids while inhibiting the formation of large crystals therein, which comprises a container for a liquid, an electromagnet mounted thereon and adapted to be energized by alternating current, and means in contact with the liquid in the container, and in operative relationship with said electro-magnet as an armature for imparting to said liquid vibrational impulses of a frequency within the audible range, and of an amplitude which is so small as not to produce bodily linear movement or splattering of the liquid.

GEORGE SPERTI.